United States Patent
Craig et al.

(10) Patent No.: US 10,812,510 B2
(45) Date of Patent: Oct. 20, 2020

(54) ANTICIPATORY CYBER DEFENSE

(71) Applicant: The Boeing Company, Chicago, IL (US)

(72) Inventors: John A Craig, Snohomish, WA (US); Jadranka Mead, Renton, WA (US); James E. Vasatka, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 484 days.

(21) Appl. No.: 15/870,275

(22) Filed: Jan. 12, 2018

(65) Prior Publication Data
US 2019/0222593 A1  Jul. 18, 2019

(51) Int. Cl.
*H04L 29/06*  (2006.01)
*G06N 20/20*  (2019.01)
(Continued)

(52) U.S. Cl.
CPC .......... *H04L 63/1425* (2013.01); *G06F 21/55* (2013.01); *G06F 21/577* (2013.01); *G06N 20/00* (2019.01); *G06N 20/20* (2019.01); *H04L 63/14* (2013.01); *H04L 63/1433* (2013.01); *H04L 63/20* (2013.01); *G06F 2221/034* (2013.01)

(58) Field of Classification Search
CPC . H04L 63/1425; H04L 63/14; H04L 63/1433; H04L 63/20; H04L 63/1466; H04L 63/1408; G06N 20/20; G06F 21/55; G06F 21/577; G06F 2221/034
See application file for complete search history.

(56) References Cited

U.S. PATENT DOCUMENTS

| | | | |
|---|---|---|---|
| 7,640,583 B1 | 12/2009 | Marinescu et al. | |
| 8,983,889 B1 * | 3/2015 | Stoneman | G06N 20/00 706/46 |

(Continued)

OTHER PUBLICATIONS

Baybutt, Paul. "Cyber security vulnerability analysis: An asset-based approach." Process Safety Progress 22.4 (2003): 220-228. (Year: 2003).*

(Continued)

*Primary Examiner* — Alexander Lagor
*Assistant Examiner* — Sameera Wickramasuriya
(74) *Attorney, Agent, or Firm* — MH2 Technology Law Group LLP

(57) ABSTRACT

According to various embodiments, techniques for anticipatory cyber defense are disclosed. The techniques includes receiving cyber incident reports, extracting keywords from the reports, applying a shallow machine learning technique to obtain an identification of a first subset of the networked assets vulnerable to at least a first threat scenario and an identification of the first threat scenario, applying a deep machine learning technique to at least the first subset, the first threat scenario, the keywords, and the plurality of networked assets, to obtain a second subset of the networked assets vulnerable to at least a second threat scenario and the second threat scenario, simulating the networked assets and the second threat scenario to identify at least one path through the networked assets vulnerable to at least a third threat scenario, and outputting an identification of the at least one path and an identification of the third threat scenario.

20 Claims, 12 Drawing Sheets

(51) Int. Cl.
*G06F 21/55* (2013.01)
*G06F 21/57* (2013.01)
*G06N 20/00* (2019.01)

(56) References Cited

U.S. PATENT DOCUMENTS

| | | | | |
|---|---|---|---|---|
| 10,122,747 | B2* | 11/2018 | Mahaffey | H04L 41/142 |
| 2007/0016955 | A1* | 1/2007 | Goldberg | G06Q 40/08 |
| | | | | 726/25 |
| 2007/0260567 | A1* | 11/2007 | Funge | G06N 20/00 |
| | | | | 706/47 |
| 2008/0016569 | A1* | 1/2008 | Hammer | G06F 21/554 |
| | | | | 726/23 |
| 2009/0043637 | A1* | 2/2009 | Eder | G06N 7/005 |
| | | | | 705/35 |
| 2014/0199664 | A1* | 7/2014 | Sadeh-Koniecpol | |
| | | | | G06F 21/563 |
| | | | | 434/118 |
| 2016/0042179 | A1 | 2/2016 | Weingarten et al. | |
| 2016/0044057 | A1* | 2/2016 | Chenette | H04L 63/20 |
| | | | | 726/1 |
| 2017/0026391 | A1* | 1/2017 | Abu-Nimeh | G06F 21/552 |
| 2017/0103674 | A1* | 4/2017 | Sadeh-Koniecpol | |
| | | | | H04L 63/1433 |
| 2017/0228658 | A1* | 8/2017 | Lim | G06K 9/6221 |
| 2017/0346839 | A1* | 11/2017 | Peppe | H04L 63/1433 |
| 2019/0014133 | A1* | 1/2019 | David | G06N 3/0445 |
| 2019/0102337 | A1 | 4/2019 | Brabec et al. | |
| 2019/0104138 | A1 | 4/2019 | Storms et al. | |
| 2019/0149572 | A1* | 5/2019 | Gorodissky | H04L 43/06 |
| | | | | 726/25 |
| 2019/0215329 | A1 | 7/2019 | Levy | |

OTHER PUBLICATIONS

Clark, K., J. Dawkins, and J. Hale. "Security risk metrics: Fusing enterprise objectives and vulnerabilities." Proceedings from the Sixth Annual IEEE SMC Information Assurance Workshop. IEEE, 2005. (Year: 2005).*

Rui, Liu, et al. "Optimization of hierarchical vulnerability assessment method." 2009 2nd IEEE International Conference on Broadband Network & Multimedia Technology. IEEE, 2009. (Year: 2009).*

Kuhl et al., "Cyber Attack Modeling and Simulation for Network Security Analysis," Proc. of the 2007 Winter Simulaton Conference, IEEE, pp. 1180-1188.

* cited by examiner

ANTICIPATORY CYBER DEFENSE

FIELD

This disclosure relates generally to anticipating and addressing cyber security threats.

BACKGROUND

The arena of cyber security threat and intrusion detection and mitigation is growing exponentially, and the advanced persistent threat lies in the energy, creativity and resources of the world of governmental, industrial, criminal and casual cyber attackers. Traditional defenses that rely upon detection, analysis, and reaction are insufficient in the onslaught of threats that are encountered every day. The non-criminal world moves slowly, relying upon debate, consensus and jurisprudence to restore confidence and trust in our institutions. This pace is glacial in comparison with the hypersonic speed of the un-thwarted and un-restrained attackers of our information systems.

Today, the victims of a cyber-attack typically report it within 14-30 days after the attack is discovered, that is, following the root cause analysis. Although the timelines for submitting the initial incident notification vary with agencies and private industry, and are subject to change, currently some branches of government and private sector are under obligation to report such incidents within one hour after the initial incident has been detected. The initial incident reports may contain not validated and very sparse level of information. These reports may be required to be updated rapidly as new information becomes available.

In order to adhere to the 24 hour reporting limit, different methods and systems have to be in place. This is necessary in order to make use of the sparse but immediate information, with the goal to put certain systems on alert and/or prevent the same or same kind of attack on one's own infrastructure or products.

SUMMARY

According to various embodiments, a computer-implemented method of anticipatory cyber defense of a plurality of networked assets is disclosed. The method includes receiving a plurality of cyber incident reports; extracting keywords from the plurality of cyber incident reports; applying a shallow machine learning technique to at least the keywords and identifications of the plurality of networked assets to obtain an identification of a first subset of the networked assets vulnerable to at least a first threat scenario and an identification of the first threat scenario; applying a deep machine learning technique to at least the identification of a first subset of the networked assets vulnerable to the first threat scenario, the identification of the first threat scenario, the keywords, and identifications of the plurality of networked assets, to obtain an identification of a second subset of the networked assets vulnerable to at least a second threat scenario and an identification of the second threat scenario; simulating the plurality of networked assets and the second threat scenario to identify at least one path through the plurality of networked assets vulnerable to at least a third threat scenario; and outputting an identification of the at least one path through the plurality of networked assets and an identification of the at least a third threat scenario.

Various optional features of the above embodiments include the following. The method may include adding the identification of the at least one path through the plurality of networked assets and the identification of the at least a third threat scenario to the plurality of cyber incident reports; repeating the extracting, the applying a shallow machine learning technique, the applying a deep machine learning technique, and the simulating at least once to identify at least a second path through the plurality of networked assets vulnerable to at least a fourth threat scenario; and outputting an identification of the at least a second path through the plurality of networked assets and an identification of the at least a fourth threat scenario. The method may include taking remedial measures against at least the third threat scenario. The remedial measures may include at least one of: installing at least one security measure, closing at least one port, turning off at least one asset, or disconnecting at least one asset. The shallow machine learning technique may include a nearest neighbor technique. The deep machine learning technique may include a neural network technique, an association rule mining technique, or a word embedding technique. The simulating may be performed by a discrete event simulation (DES) engine. The method may include limiting a number of paths identified by the simulating. The limiting may include at least one of: pruning a number of paths identified by the simulating, or limiting a number of levels in the deep machine learning technique. The extracting keywords from the plurality of cyber incident reports may further include extracting keywords from the plurality of cyber incident reports, from at least one historical anomaly database, from at least one threat scenario database, and from an asset database.

According to various embodiments, a system for anticipatory cyber defense of a plurality of networked assets is disclosed. The system includes at least one electronic processor configured to perform: receiving a plurality of cyber incident reports; extracting keywords from the plurality of cyber incident reports; applying a shallow machine learning technique to at least the keywords and identifications of the plurality of networked assets to obtain an identification of a first subset of the networked assets vulnerable to at least a first threat scenario and an identification of the first threat scenario; applying a deep machine learning technique to at least the identification of a first subset of the networked assets vulnerable to the first threat scenario, the identification of the first threat scenario, the keywords, and identifications of the plurality of networked assets, to obtain an identification of a second subset of the networked assets vulnerable to at least a second threat scenario and an identification of the second threat scenario; simulating the plurality of networked assets and the second threat scenario to identify at least one path through the plurality of networked assets vulnerable to at least a third threat scenario; and outputting an identification of the at least one path through the plurality of networked assets and an identification of the at least a third threat scenario.

Various optional features of the above embodiments include the following. The at least one electronic processor may be further configured to perform: adding the identification of the at least one path through the plurality of networked assets and the identification of the at least a third threat scenario to the plurality of cyber incident reports; repeating the extracting, the applying a shallow machine learning technique, the applying a deep machine learning technique, and the simulating at least once to identify at least a second path through the plurality of networked assets vulnerable to at least a fourth threat scenario; and outputting an identification of the at least a second path through the plurality of networked assets and an identification of the at least a fourth threat scenario. The at least one electronic processor may be further configured to take remedial measures against at least the third threat scenario. The remedial measures may include at least one of: installing at least one security measure, closing at least one port, turning off at least one asset, or disconnecting at least one asset. The shallow machine learning technique may include a nearest neighbor technique. The deep machine learning technique may include a neural network technique, an association rule mining technique, or a word embedding technique. The simulating may be performed by a discrete event simulation (DES) engine. The at least one electronic processor may be further configured to limit a number of paths identified by the simulating. The limiting may include at least one of: pruning a number of paths identified by the simulating, or limiting a number of levels in the deep machine learning technique. The extracting keywords from the plurality of cyber incident reports may further include extracting keywords from the plurality of cyber incident reports, from at least one historical anomaly database, from at least one threat scenario database, and from an asset database.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Figure 1:
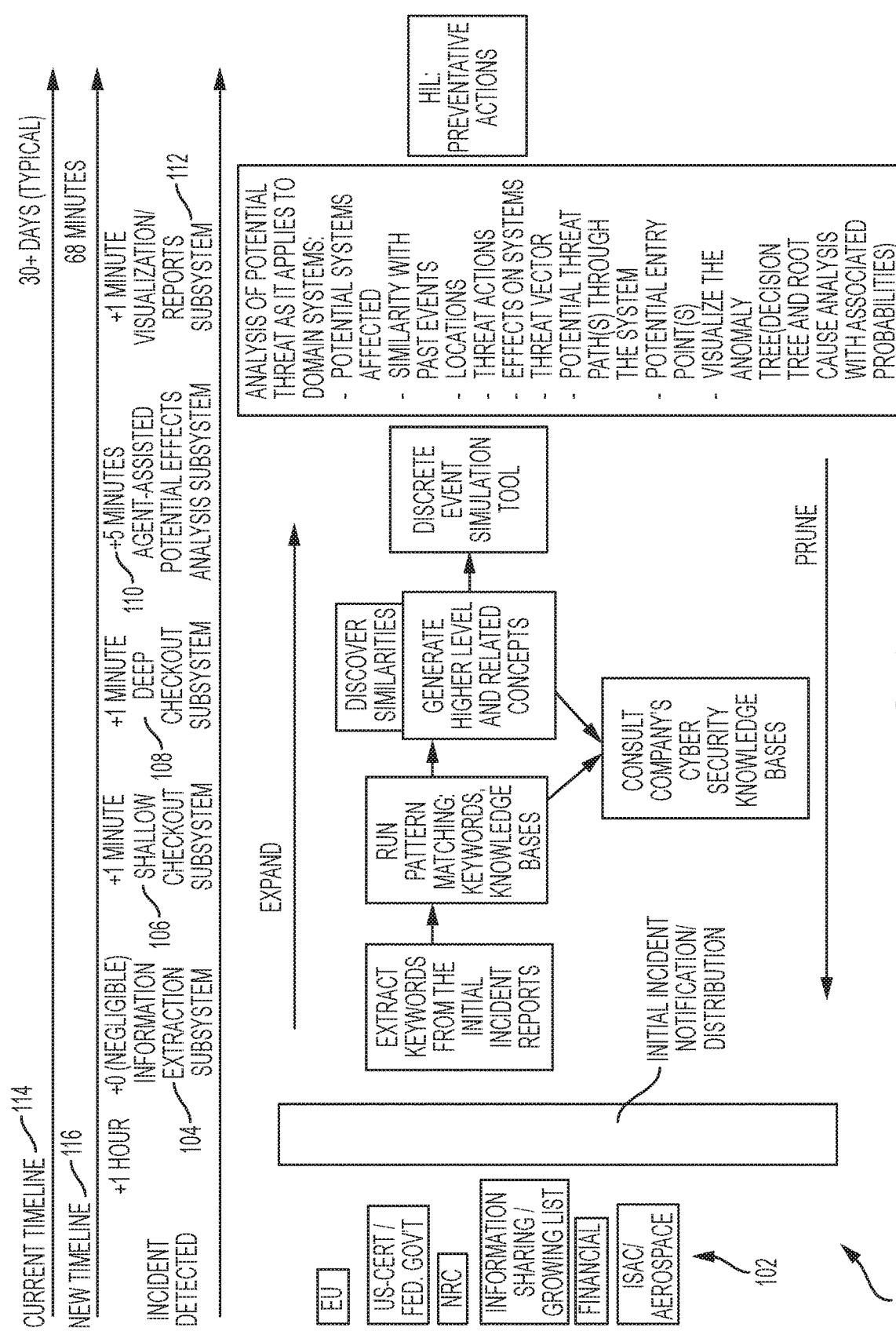
FIG. 1 is a schematic diagram of a system according to various embodiments.

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Under certain policies under the Federal Information Security Management Act, some entities will need to publicly report cyber-attacks within 24 hours of their detection. Such policies require that the cause analysis to be moved to the closing phase of the incident handling process in order to expedite initial notification. The "catch" is that companies are as vulnerable as before, if they will be waiting for signature updates, or partial or full cause analysis (for instance, where the attack came from). These are expected to be unavailable with the initial incident notification. Because a cause analysis can take from 24 hours to 30 days or more, some embodiments provide an opportunity to act a full month earlier, and quite possibly before the same type of attack takes place to one's own infrastructure. Thus, some embodiments permit compliance with initial early notification requirements, even though information is very sparse.

Some embodiments accept as input one or more initial incident reports and output various information useful for protecting against a cyber threat. Some embodiments identify all systems in the enterprise that could potentially be attacked by the same method and attacker as described in the initial incident report(s). Some embodiments identify all potential paths the attacker could take to arrive to the same level and location of system compromise as is described in the initial incident report(s). Some embodiments inform a human user of the potentially-attacked systems and the potential attack paths within seven minutes of receipt of the initial incident report(s). Some embodiments reduce the vulnerability window, based on the available initial information about the attack, from 14-30 days after the attack has been discovered, per the prior art, down to about 68 minutes (FIG. 1) after the attack has been discovered, well within the 24 hour reporting limit. Some embodiments iterate the identifying steps each time a new, updated report comes in, that is an update to the initial incident report. Further, some embodiments prune the branches of the possible cyber-attack tree as they become obsolete, and add new leaves, intermediate nodes, or top level nodes as they become identified in the updated incident reports. These and other embodiments are described herein in detail.

FIG. 1 is a schematic diagram of a system 100 according to various embodiments. Some embodiments compute potential threats to a target enterprise system of interconnected assets, based on an arbitrarily sparse initial incident report from a similar or different industry sector. Some embodiments associate probabilities of attack on each of target system's assets, defined per, and based on, a Discrete Event Simulation (DES) process or engine. Some embodiments compute the potential attack path(s), including, where appropriate, entry points into the target system. Some embodiments present any, or a combination, of the above findings to a human user for further action. Some embodiments take further action automatically. Further action may include, e.g., preparing the human user for the attack, closing down ports or system portions, installing further security measures on potential target assets, and other measures.

Inputs 102 to system 100 include initial incident reports. Such incident reports are generated and may be provided to system 100 as soon as the incident happens (or is detected). Incident reports may be available through industry sharing mechanisms or the government(s). Incident reports are typically in a computer-readable text format. No specific format or taxonomy is assumed, because a variety of sources will have different methods and taxonomies. The incident reports may include the top level observations of anomalous behavior, such as compromise of a file system (e.g., files deleted, encrypted, etc.), slowdown in processing, or a website defacing. Incident reports may include some indications of computer systems related to the compromised point, such as the type of file system or database, the type and version of operating system, or the internet browser type and version. Incident reports may be computer readable and include non-structured (text, expressed in natural language) information. Incident reports may be updated quickly (e.g. every hour), or slowly, with new information (e.g., as details become available). Such new information may be any of the following, and in any order: type of the initial entry point (e.g. internet, internal), how the attacker gained access (e.g., password cracker, a password was stolen months earlier), identification of an executable, identification of memory access, obfuscation technique, internet address the attack came from, or a new malware signature or executable, and finally full details of the attack.

Input 102 may further include any, or a combination, of U.S. Government issued reports, European Union issued reports, the United States Computer Emergency Readiness Team (US-CERT), the U.S. Nuclear Regulatory commission (NRC), privately-curated lists, lists from the financial sector, or Information Sharing and Analysis Centers (ISAC), e.g., from the aerospace sector.

Input 102 may further include any, or a combination, of a database with historical anomaly information, a database with threat scenarios, or a database of all (user) system assets, their immediate (nearest neighbor) interconnections, and their hardware and software version(s). Such electronic databases are an industry norm, and their manipulation is an industry standard.

System 100 also includes information extraction subsystem 104, which is described in detail below in reference to FIG. 3.

System 100 also includes two machine learning models. During processing steps, system 100 has access to shallow machine learning subsystem 106, e.g., based on the one of the versions of the nearest neighbors method or some other efficient pattern matching method, and deep machine learning subsystem 108, e.g., based on a convolutional neural network. Shallow machine learning subsystem 106 is described in detail below in reference to FIGS. 4 and 5. Deep machine learning subsystem 108 is described in detail below in reference to FIG. 6.

System 100 also includes discrete event simulation subsystem 110. Discrete event simulation subsystem 110 is described in detail below in reference to FIG. 7.

System 100 also includes reporting subsystem 112, which outputs reports and information. The reports and information can include a textual and/or visual representation of any, or a combination, of: whether the target system could be compromised or not, e.g., judging by the information available in the initial Incident report, as well as the probability associated with this event happening, a list of potential assets that could be compromised, and the probabilities associated with these outcomes, the potential paths the attack could take through the entity's systems and assets, and the probabilities associated with them, and/or the potential entry points into the system, and the probabilities associated with them. Further, the reports and information can include any, or a combination, of: similarities to past events, locations of events, threat actions, effects on systems, threat vector(s), or a visualization of the anomaly tree (decision tree and root cause analysis with associated probabilities).

Note that FIG. 1 also includes exemplary current timeline 114 and exemplary new timeline 116. As depicted, exemplary current timeline indicates that getting to a root cause analysis typically takes 30 days or more. It is only at this time that attack signatures are generated and distributed to the industry to start the threat prevention process. Exemplary new timeline 116 indicates that, according to some embodiments, initial incident notification may take about an hour, processing by information extraction subsystem 104 may take negligible time, processing by shallow machine learning subsystem may take about one minute, processing by deep machine learning subsystem 108 may take about one minute, processing by discrete event simulation subsystem 110 may take about five minutes, and outputting a report or other information relevant to threat prevention may take about a minute, allowing the industry to start the threat prevention process at that time. Accordingly, some embodiments show great improvement over existing techniques.

Figure 2:
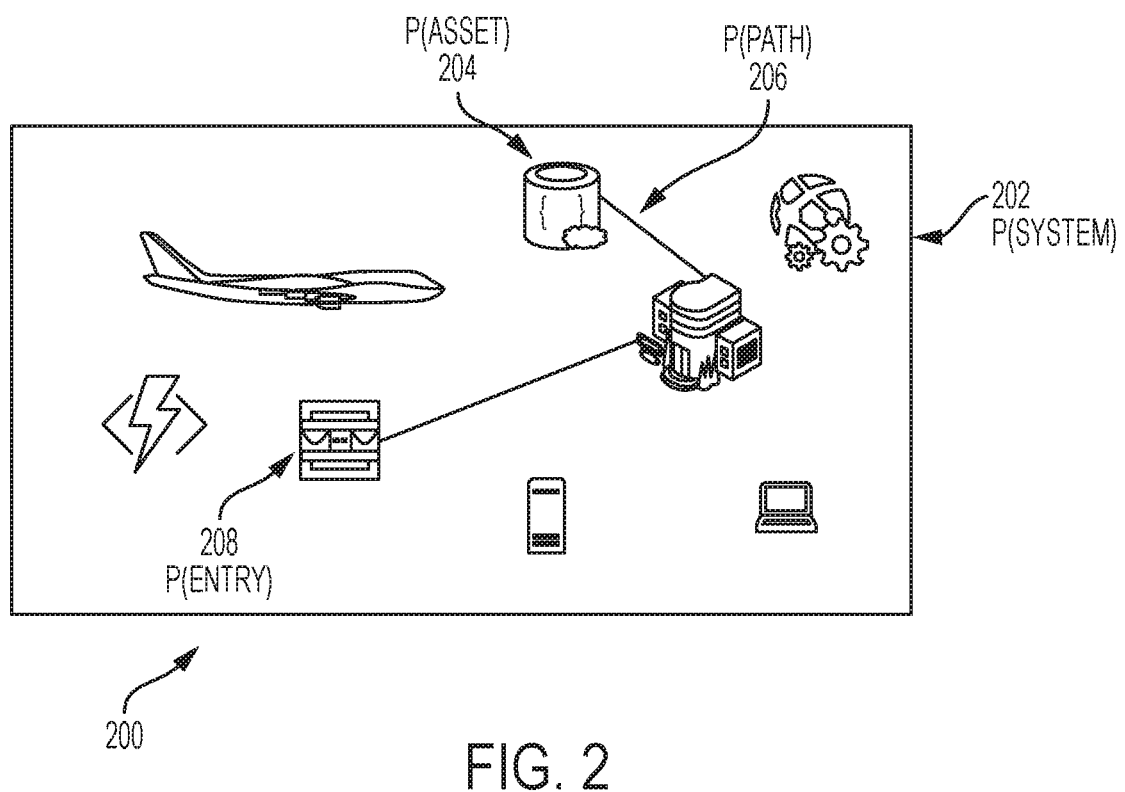
FIG. 2 is a schematic diagram of system outputs according to various embodiments.

FIG. 2 is a schematic diagram of system outputs according to various embodiments. Target system 200 includes (possibly) interconnected assets such as airplanes, databases, airports, web services, end-user devices, wireless and wired connections, email services etc. The output of some embodiments can include any, or a combination, of the following:

Probability that the target system can be compromised by same or similar attack P(System) 202;
Probability that an asset can be compromised by same or similar attack, P(Asset) 204;
Probability that a connectivity path between different assets can be compromised by same or similar attack, P(Path) 206; or
Probability that an entry point into the system can be compromised by same or similar attack, P(Entry) 208.

Figure 3:
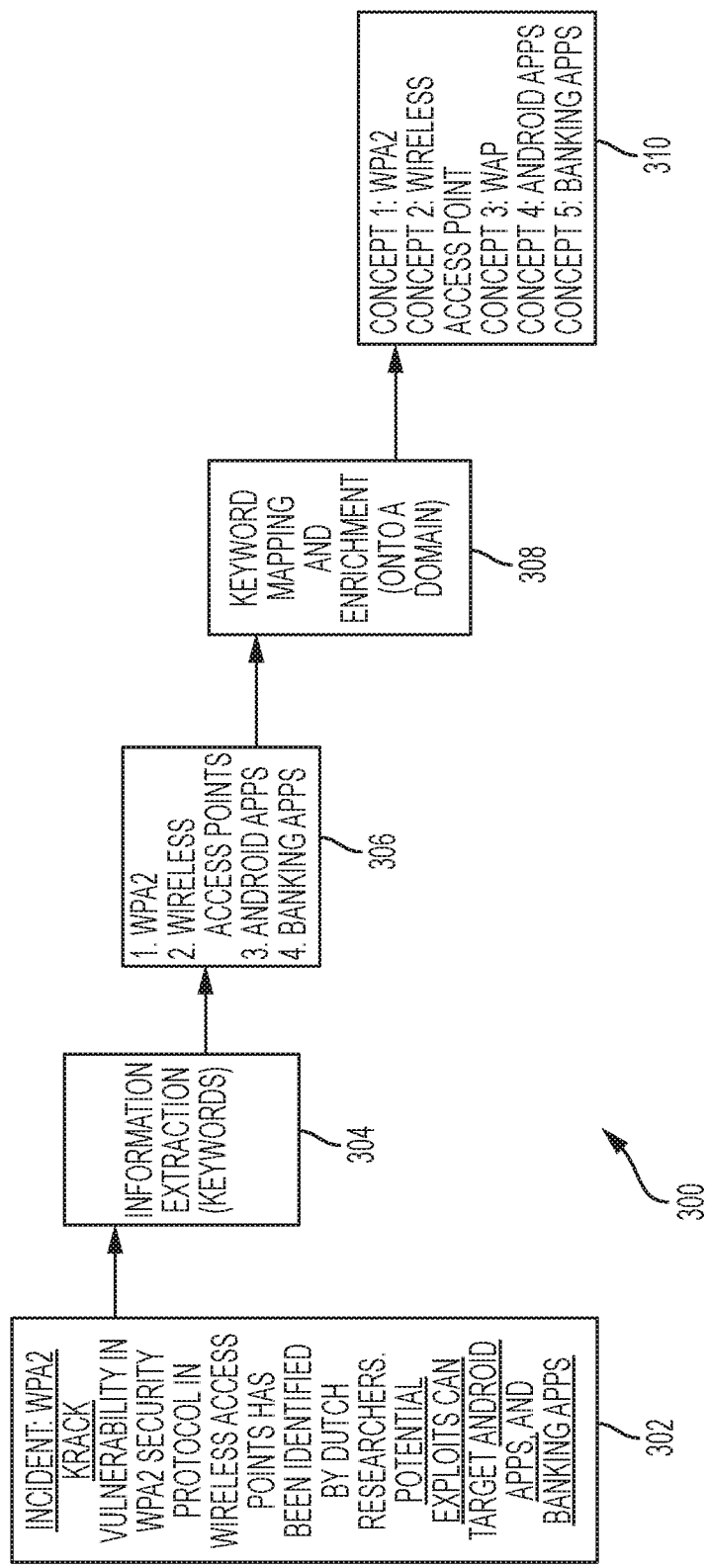
FIG. 3 is a hybrid diagram of an information extraction subsystem according to various embodiments.

FIG. 3 is a hybrid diagram of an information extraction subsystem 300 according to various embodiments. The purpose of the information extraction subsystem is to extract meaningful concepts and keywords from the initial incident report(s). The initial incident report includes a textual description of what is the operator's observation of system's external behavior once an anomaly is detected. It may include a description that the assets which are being observed as behaving anomalously, and possibly some further observational information. As time progresses, the initial incident report will be updated with more information as it becomes available.

Some embodiments do not require that all initial incident reports to adhere to the format as in NIST SP 800-61 Rev 2 (e.g., it could have originated in the European Union or a country which does not follow NIST guidelines). Therefore this subsystem acts to parse and extract the information that is used by other system components.

As shown in FIG. 3, the inputs to information extraction subsystem 300 include at least one initial incident report 302, from any source and in any format, structured and unstructured, in a wide variety of conceptual levels. Such initial incident reports include a description of a system behaving anomalously, and the anomalous behavior is specified (e.g., slowdown, exfiltration, etc.). Initial incident report 302 as shown in FIG. 3 includes a description of a vulnerability to WPA2 called "Krack". The domain asset to be protected is WAP (Wireless Access Point) in the domain's taxonomy, which may be obtained by using an Associative Rule Mapping machine learning technique, belonging to the shallow class of machine learning techniques, to the domain's asset description database.

Inputs to information extraction subsystem 300 also include a description of the assets to be protected. Information extraction subsystem 300 may obtain such information from an electronic database of all (user) system assets, their immediate interconnections, and their hardware and software version(s), e.g., as in input 102 to system 100 of FIG. 1.

Information extraction engine 304 may employ any standardized Extract Transform Load (ETL) or Information Extraction Tools (IET) process, configured and specialized for the domain (i.e., set of assets to be protected), and mapped on a taxonomy of the target company's assets. These tools extract keywords related to observed anomalous behavior (e.g. proprietary, information, exfiltration, database, etc.) and the types of system/asset attacked (e.g., a database management system (DBMS) version). Such tools output a taxonomy of the event, and possibly one or both of a known (sub)sequence of anomalous sub-events, or a root cause, an entry point, and a complete threat trajectory. As shown in FIG. 3, information extraction engine 304 extracts the following extracted terms 306 from initial incident report 302: "wpa2", "wireless", "access points", "android apps", and "banking apps".

Information extraction subsystem 300 also includes keyword mapping engine 308, which maps extracted terms 306 onto the description of the assets to be protected provided as an input. Keyword mapping engine 308 provides as an output an electronically represented association 310 between the extracted keywords and the electronic assets to be protected.

Figure 4:
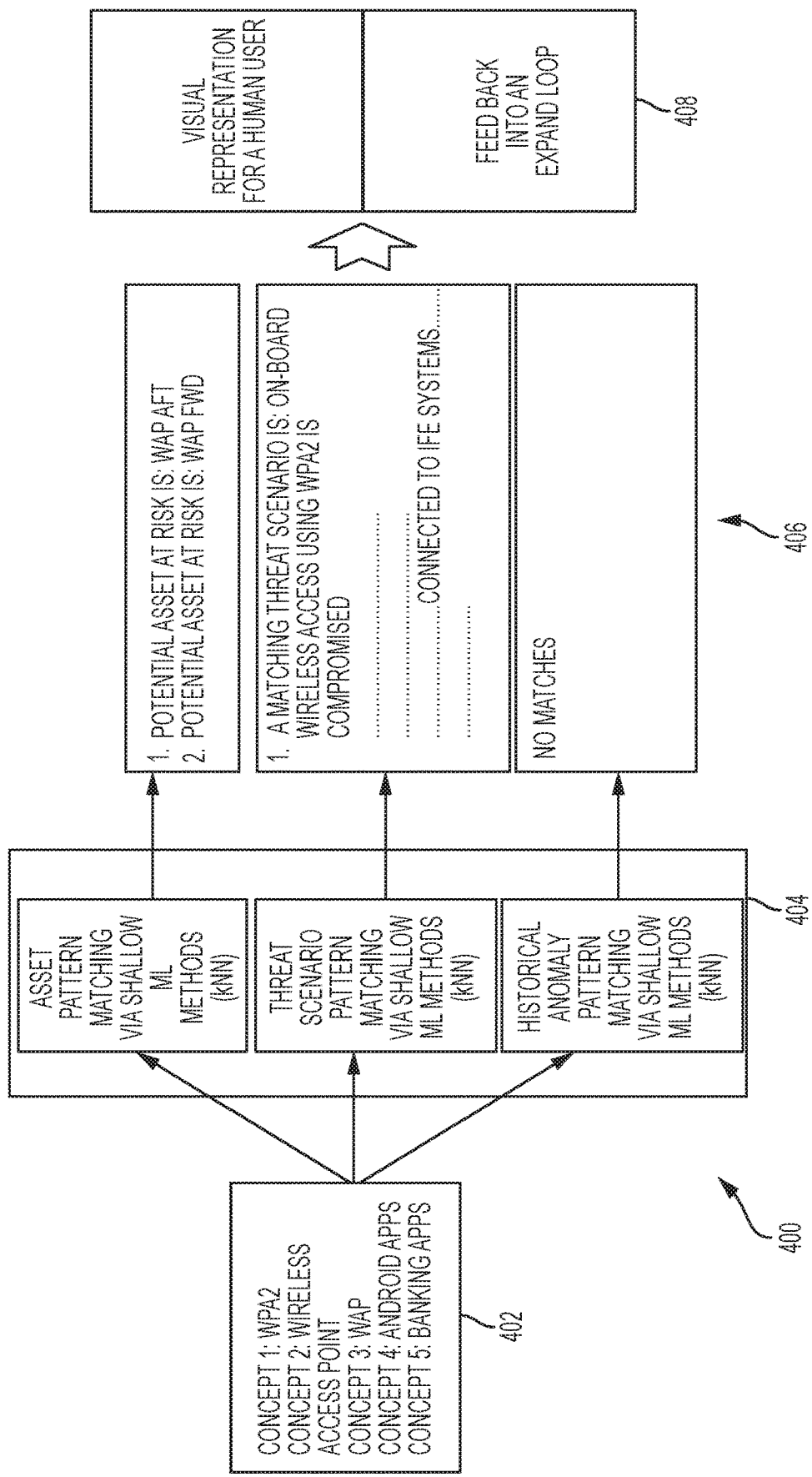
FIG. 4 is a hybrid diagram of a shallow machine learning subsystem according to various embodiments.

FIG. 4 is a hybrid diagram of a shallow machine learning subsystem 400 according to various embodiments. Shallow machine learning subsystem 400 uses efficient algorithms and derives fast matches between the initial incident report and the target system descriptions, i.e., descriptions of the assets to be protected. Shallow machine learning subsystem 400 may operate at the level of syntactic (text) similarity, as opposed to semantic (meaning) similarity, which is the level of operation of deep machine learning subsystem 600 of FIG. 6, described below. Shallow machine learning subsystem essentially answers two questions. The first is: "Has something like this happened to us before?", and the second is: "Can something like this happen to us"?

Inputs 402 to shallow machine learning subsystem 400 include: a list of keywords, assets, and anomalies output from information extraction subsystem 300 of FIG. 3, and an asset database. The asset database may include a description of the assets to be protected, their immediate (e.g., nearest neighbor) interconnections, and their hardware and software version(s), e.g., as in input 102 to system 100 of FIG. 1. Inputs 402 may further include information from one or both of: a historical anomaly database, and a threat scenario database.

Several different machine learning pattern matching methods are suitable for shallow machine learning subsystem 400. For example, in addition to the Associative Rule mapping, the k-nearest-neighbors (KNN) method may be used. This method in its simplest form does not require pre-training. It belongs to the category of "lazy" machine learning methods. "Nearest" may be gauged by a variety of metrics, by way of non-limiting examples, Hamming distance or Levenstein distance. The KNN method may be applied 404 to the asset database, the threat scenario database, and the historical anomaly database. In particular, the KNN method may be applied 404 by finding the nearest neighbors in each such database to the individual keywords output from information extraction subsystem 300.

Outputs 406 of shallow machine learning subsystem 400 include one or more of the following:

An identification (e.g., a list) of the assets operational within the protected system that most closely match the assets identified by information extraction subsystem 300 (i.e., the assets of the protected system that most closely match assets that are currently under attack somewhere else, in the incident report)

An identification of threat scenarios or past anomalies, with one or more keyword matches to the association 310 of protected assets to keywords output by information extraction subsystem 300.

Pattern matching for any other forms of output of information extraction subsystem 300, such as a sequence of anomalous events, a root cause, an entry point, a threat trajectory, etc.

A visual representation of the most important drivers for anomalous behavior involving concepts elicited by subsystem 300 and subsystem 400, for our operational system, e.g., when maintenance crews plug a laptop into an aircraft system, or wireless access points.

An update to the databases for future reference and/or analysis.

Output 406 may be further processed 408, e.g., by formatting it into visual representations for a human user, or by providing it to a feedback loop as shown and described below in reference to FIG. 5.

As an example processing by shallow machine learning subsystem 400, when a new candidate (e.g., WAP, Wireless Access Point, as depicted in FIG. 4) is tested against the controlled vocabulary of nouns, phrases and other terms that represent system assets, it determines as output 406 that the nearest neighbors are WAP AFT and WAP FWD, and so on, depending on the similarity metric.

Figure 5:
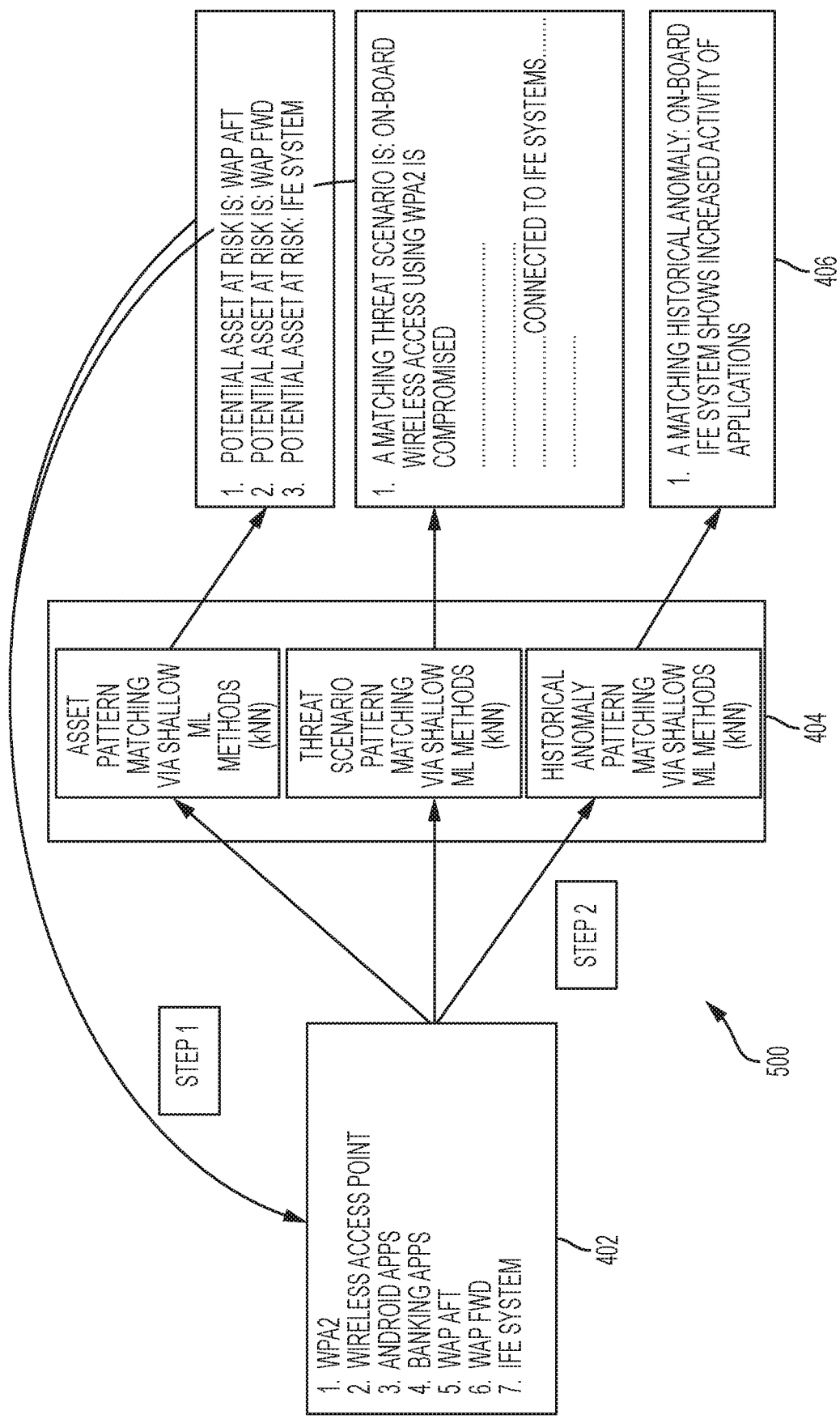
FIG. 5 is a hybrid diagram of an expand feedback loop according to various embodiments.

FIG. 5 is a hybrid diagram of an expand feedback loop 500 according to various embodiments. Expanded feedback loop 500 generates additional information by providing information of output 406 of shallow machine learning subsystem 400 of FIG. 4 back as input 402 to shallow machine learning subsystem 400. Whereas without feedback loop 500, nothing matched to information in the historical anomaly database, as depicted in FIG. 4, with feedback loop 500, a matching historical anomaly is identified in output 406, as depicted in FIG. 5. As depicted in FIG. 4, input 402 includes identifications of "WAP AFT" and "WAP FWD". These are the actual instances of the Wireless Access Points in this example, named by their location on an aircraft.

Figure 6:
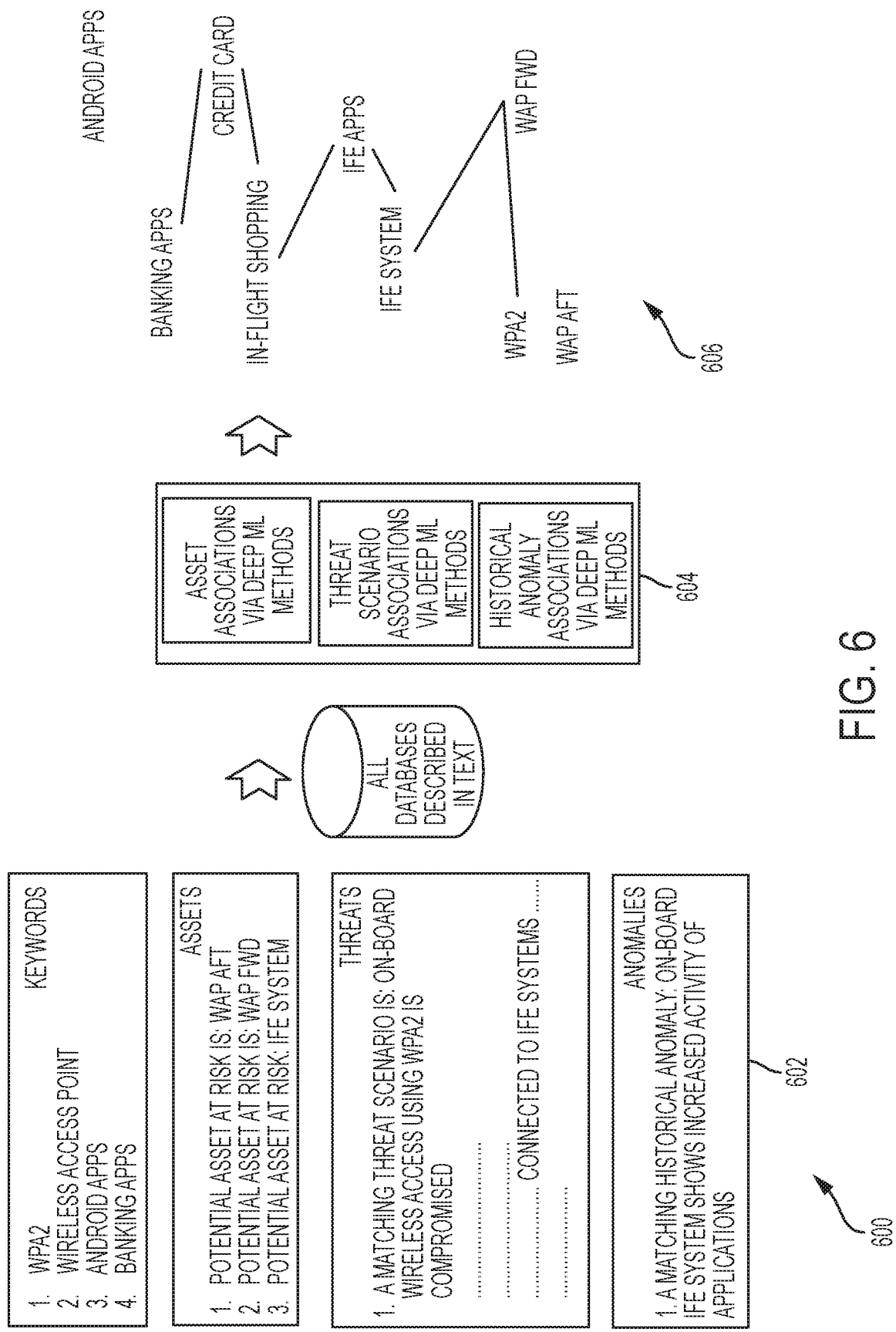
FIG. 6 is a hybrid diagram of a deep machine learning subsystem according to various embodiments.

FIG. 6 is a hybrid diagram of a deep machine learning subsystem 600 according to various embodiments. Deep machine learning subsystem 600 is used to identify matches that shallow pattern matching systems, which only work on the level of syntactic similarity, may not be able to uncover. Matches detected by deep machine learning techniques are associations at different conceptual levels, such as various types of applications in an in-flight entertainment system, or the fact that they use credit cards and thus share a feature with banking applications. Whereas shallow machine learning technique may utilize text mining and similarity searching based on a distance metric, deep methods instead focus on relationships between facts, entities and other information. Thus, deep machine learning subsystem 600 derives higher level concepts from the limited list of keywords that have been extracted by information extraction subsystem 300 of FIG. 3, and uses those to pattern match all historical databases, threat scenario databases, and asset databases on a higher (more broader) level. Deep machine learning subsystem 600 answers the question: Does this threat potentially apply to our assets, and what would it look like in our environment?

Deep machine learning subsystem 600 is used in some embodiments because initial incident report specifications are not exhaustive, and systems lacking this feature are not exhaustive either in terminology or breadth or depth of identified attack indicators, and those systems are not able to syntactically match. Within their own systems, the specific feature mentioned in initial reports may miss some important indicators of a possible attack, if both higher and lower level concepts related to the ones mentioned in the initial incident report are not included. Deep machine learning subsystem 600 does not require a uniformly applied or adapted ontology. Instead, it is ontology independent. This is because there is no one accepted formalism that could be adapted, yet embodiments should not forgo the opportunity to anticipate attacks.

Deep machine learning subsystem 600 accepts as inputs 602 all outputs from information extraction subsystem 300 and all outputs from shallow machine learning subsystem 400. Deep machine learning subsystem 600 also accepts as inputs 602 information from any, or a combination, of a database with historical anomaly information, a database with threat scenarios, and a database of all (user) system assets, their immediate interconnections, and their hardware and software version(s).

Deep machine learning subsystem 600 may implement a variety of deep learning techniques including, by way of non-limiting example, entity relation modeling (i.e., learning relationships between entities), or link and association analysis. Associative rule mapping (apriori algorithms), word embeddings, and neural networks (e.g., convolutional neural networks) are particularly suitable. Thus, the deep machine learning technique may be applied 604 to the asset database, the threat scenario database, and the historical anomaly database.

These tools create higher level concepts out of the keywords extracted from the initial incident reports. For example, if an initial incident report recites "router", then this term may lead to the examination of all border routers, interior routers, border gateway protocol (BGP) and other protocol devices, switches, and ultimately network devices. Potentially any and all of these computing, networking, storage and etc. assets may turn out to be affected, on later forensics.

The outputs 606 of deep machine learning subsystem 600 are essentially the same type of outputs as those of shallow machine learning subsystem 400, but with a broader and deeper reach. In other words, deep machine learning subsystem 600 identifies at what all is implicated by keywords, not just keywords themselves.

For example, when deep machine learning subsystem 600 is applied to the term "IFE system" (for "In-Flight Entertainment System"), it derives as outputs 606 all related applications, including in-flight shopping, associated with it. The term "in-flight shopping" is linked strongly to "credit card", another portion of outputs 606. Also note that as depicted in FIG. 6, the connection between "IFE System" and "WAP FWD" is derived from an asset database. Also note that neither of the potential targets, IFE FWD and WAP AFT, were mentioned in the initial incident report. These might be mentioned in a final (prior art) vulnerability or incident analysis report, however that would not occur until some weeks later than this step in the disclosed method.

Some embodiments may use classical natural language processing information extraction methods in deep machine learning subsystem 600. Here "information extraction" refers to a collection of methods (named entity extraction, relationship extraction, event extraction, etc.) for extracting structured information, that can be machine processable, from plain text. If an enterprise or other set of assets has an associated, labeled, list of assets and their relationships, then working with classical methods is a plus. However, an extensive, correct, properly maintained, machine readable repository of all needed information to extract the above needed information is difficult to obtain in practice. In addition to the potential un-availability of properly labelled datasets, there may be human errors in labelling and gaps in information. Therefore, some embodiments may use neural network methods in an unsupervised setting. Some methods in deep neural networks do deep learning for neuro-linguistic programming tasks in an unsupervised manner and learn from available texts and data corpus of all kinds, by accumulating knowledge about facts and relationships contained within those data and texts. Some embodiments therefore such use existing approaches that do not need any predefined ontology or relation classes to extract facts along with the relation phrases directly from any text.

Figure 7:
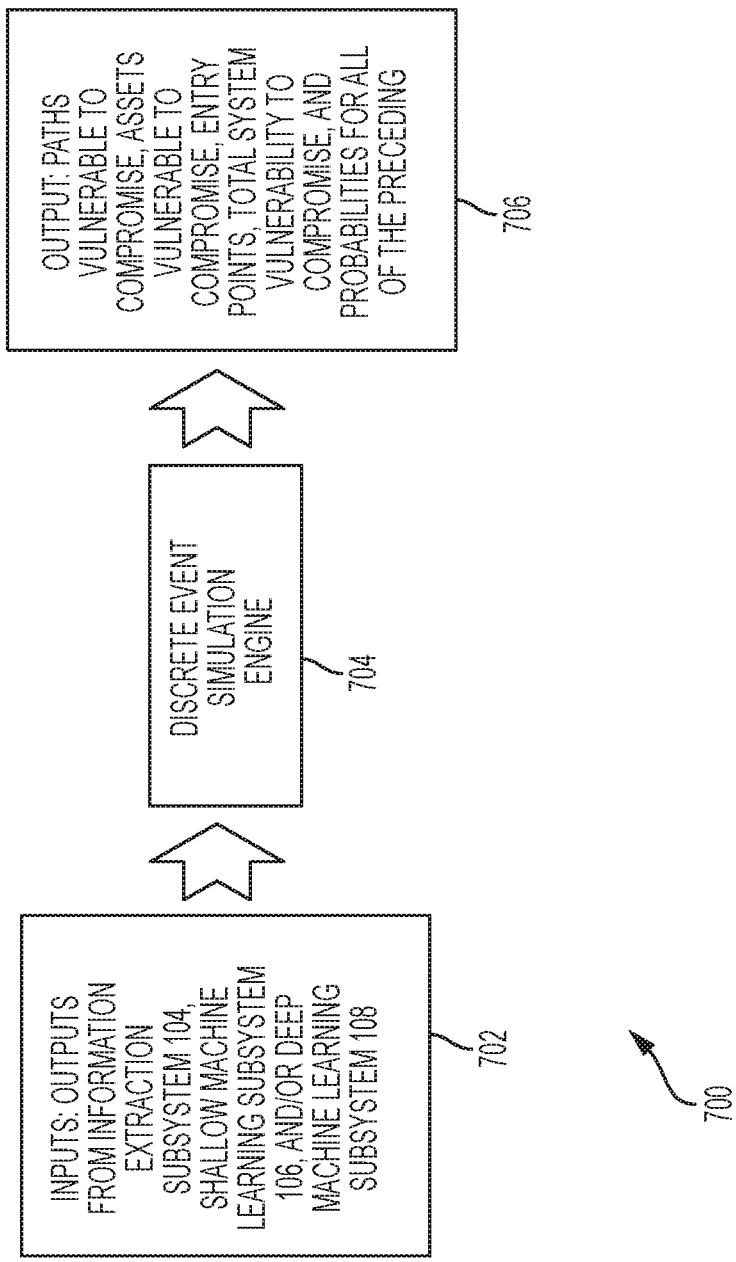
FIG. 7 is a hybrid diagram of a discrete event simulation subsystem according to various embodiments.

FIG. 7 is a hybrid diagram of a discrete event simulation subsystem 700 according to various embodiments. Discrete event simulation subsystem 700 may be used to determine a root cause, a threat path, and potential damage to the system to be protected. In more detail, discrete event simulation subsystem 700 uses a model of the protected assets to create a simulated system that includes the assets, events, and other artifacts identified by keywords and higher-level concepts. Discrete event simulation subsystem 700 uncovers root causes and potential paths through the system that could be triggered by the information about the event itself from the initial incident report and what has been added as a result of deep machine learning subsystem 600.

Inputs 702 to discrete event simulation subsystem 700 include any, or a combination, of outputs (e.g., association 310) of information extraction subsystem 300, outputs 406 of the shallow machine learning subsystem 400, and outputs 606 of deep machine learning subsystem 600.

Discrete event simulation subsystem 700 includes discrete event simulation engine 704, which implements a discrete event simulation on inputs 702 to identify and provide as output 706 all paths through our operational system that involve any one, or any combination of, the keywords from the inputs.

Thus, discrete event simulation subsystem 700 provides as outputs 706 potential attack paths through the assets under protection that the threat under consideration or a similar threat could take, entry points for such an attack, and effects on the operational system. More particularly, discrete event simulation subsystem 700 provides as outputs 706 identifications of: paths vulnerable to compromise, assets vulnerable to compromise, entry points, total system vulnerability to compromise, and probabilities for any of the preceding.

The techniques shown and described above in reference to FIG. 7 may potentially cause an excessive proliferation of identified paths. In fact, an advantage of the disclosed technique is that it can explore all the paths and combinations of the paths, which is intractable for a human to do. There are two techniques contemplated for keeping the number of identified paths to a level that not only preserves significant paths, but also ensures that the technique converges. A first pruning technique is to control the depth of the concept generation by deep machine learning subsystem 600. This technique limits how many levels of concepts are generated from the keywords by deep machine learning subsystem 600. This is a configurable system parameter. Note that the first technique is applied in the forward, "expand", direction of the system. A second pruning technique is to prune the branches, or entire paths, through the system. This technique is described in reference to FIGS. 8 and 9, below.

Figure 8:
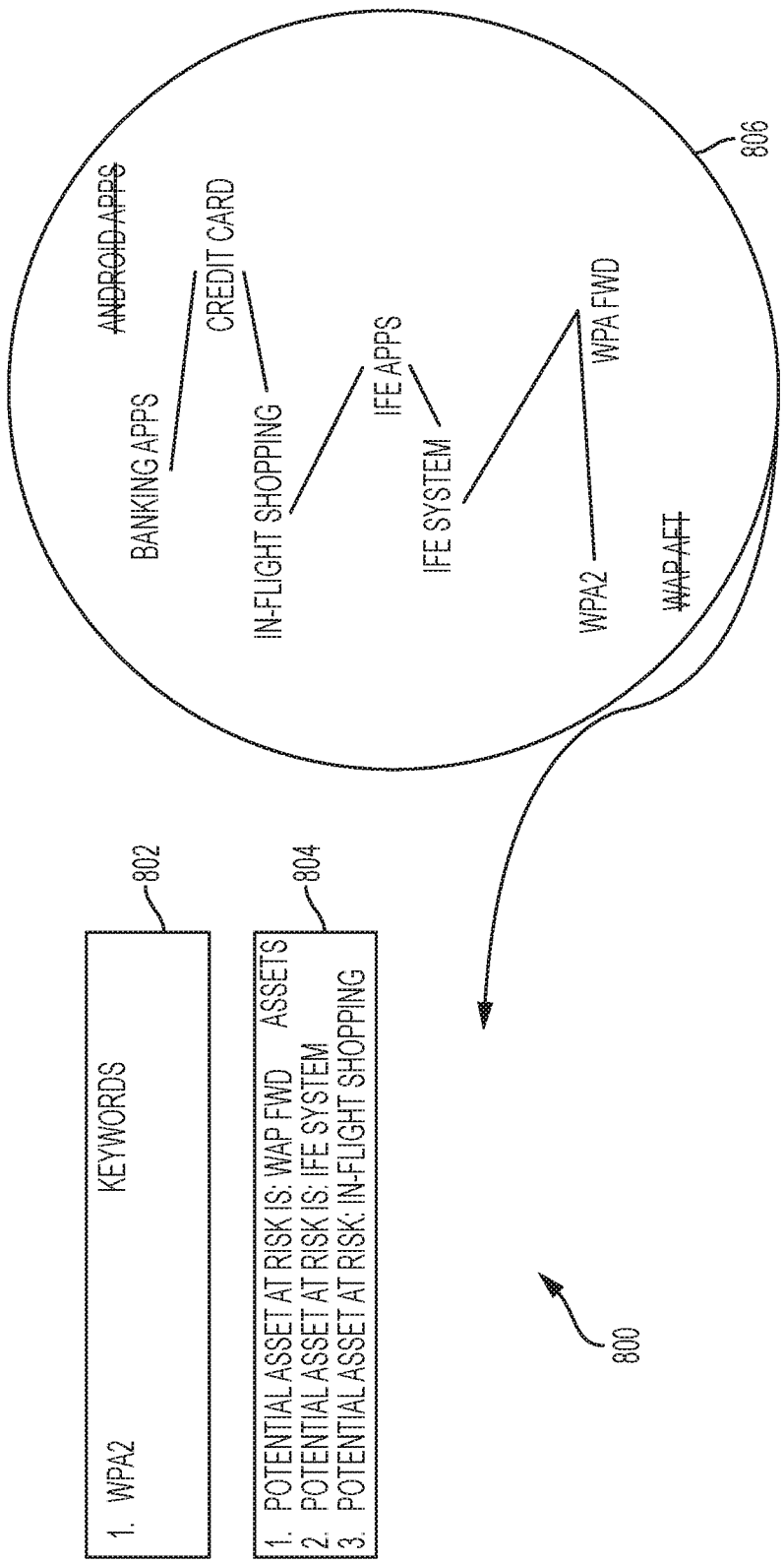
FIG. 8 is a first hybrid diagram of a prune loop according to various embodiments.

FIG. 8 is a first hybrid diagram of a prune loop 800 according to various embodiments. This technique is used in the backward "prune" direction, where system 100 returns to its "listening" state and waits for the further updates. More detailed information will make system 100 converge in sequential steps to a manageable and human-presentable state. In general, prune loop 800 deletes all entries in keyword list 802 and watch list 804 that have found no connectivity with any other concepts, as depicted in conceptual diagram 806, after processing by deep machine learning subsystem 600 has terminated. After the prune loop 800, the system settles into a LISTEN state with the current knowledge of assets to watch: WAP FWD, IFE System and In-Flight Shopping.

Figure 9:
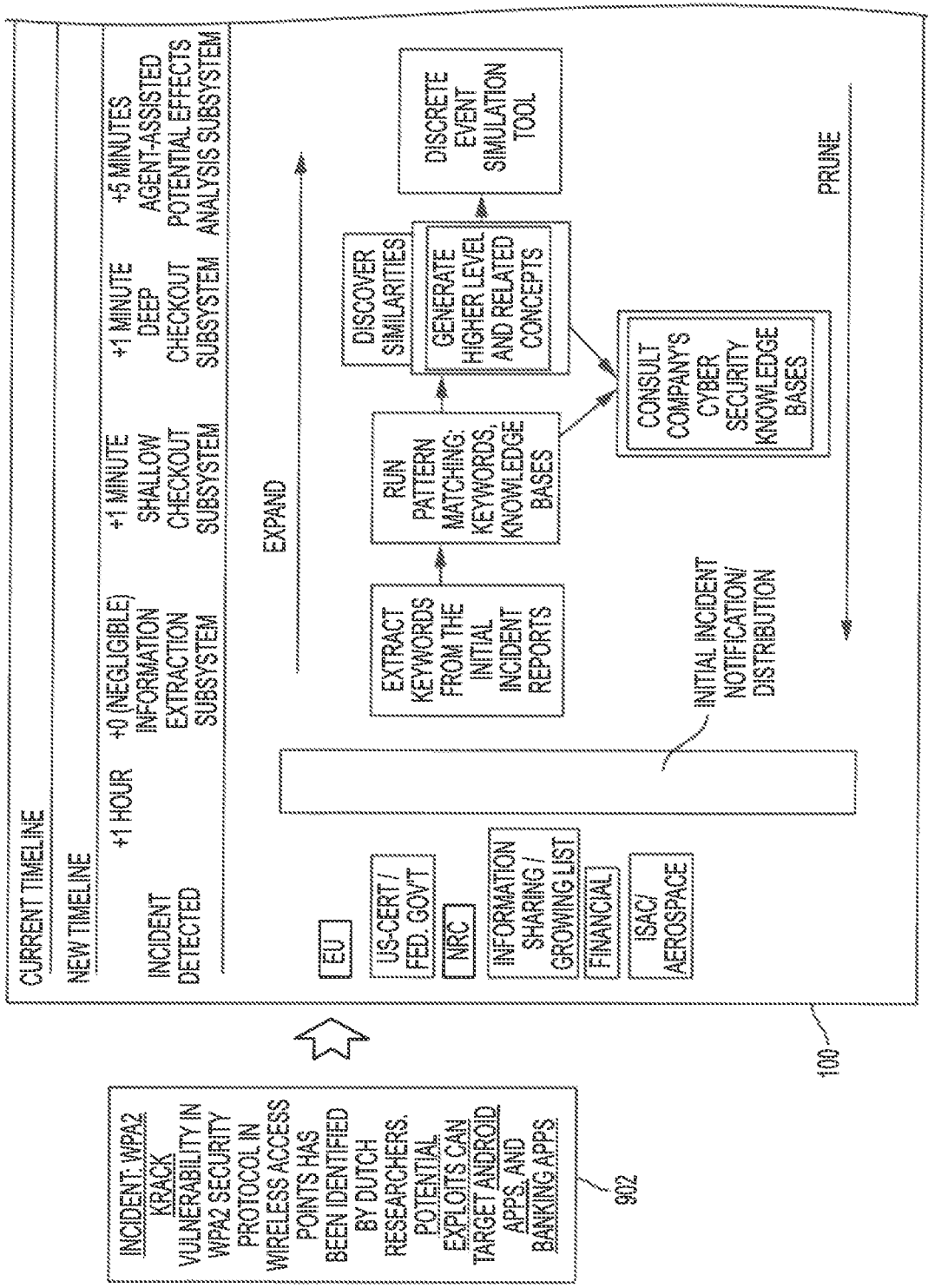
FIGS. 9 and 10 depict a second hybrid diagram of a prune loop according to various examples.
Figure 10:
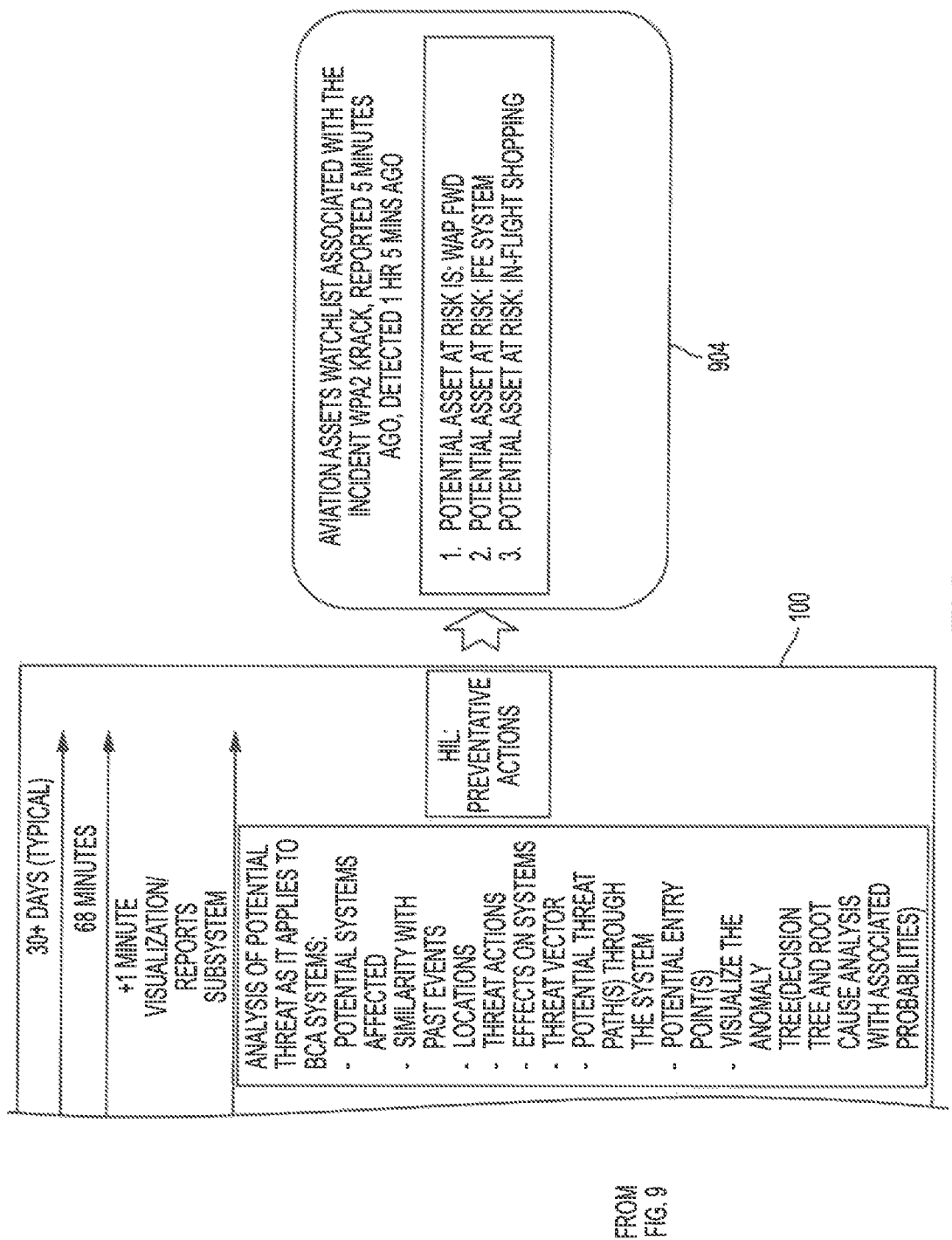

FIGS. 9 and 10 depict a second hybrid diagram of a prune loop according to various examples. System 100 has transitioned from initial incident report 902 to the assets to watch 904. The display to the user may resemble the boxes on the right side according to some embodiments. Notice that none of the syntax in initial incident report 902 is an identical match to any of the syntax in assets to watch 904.

Figure 11:
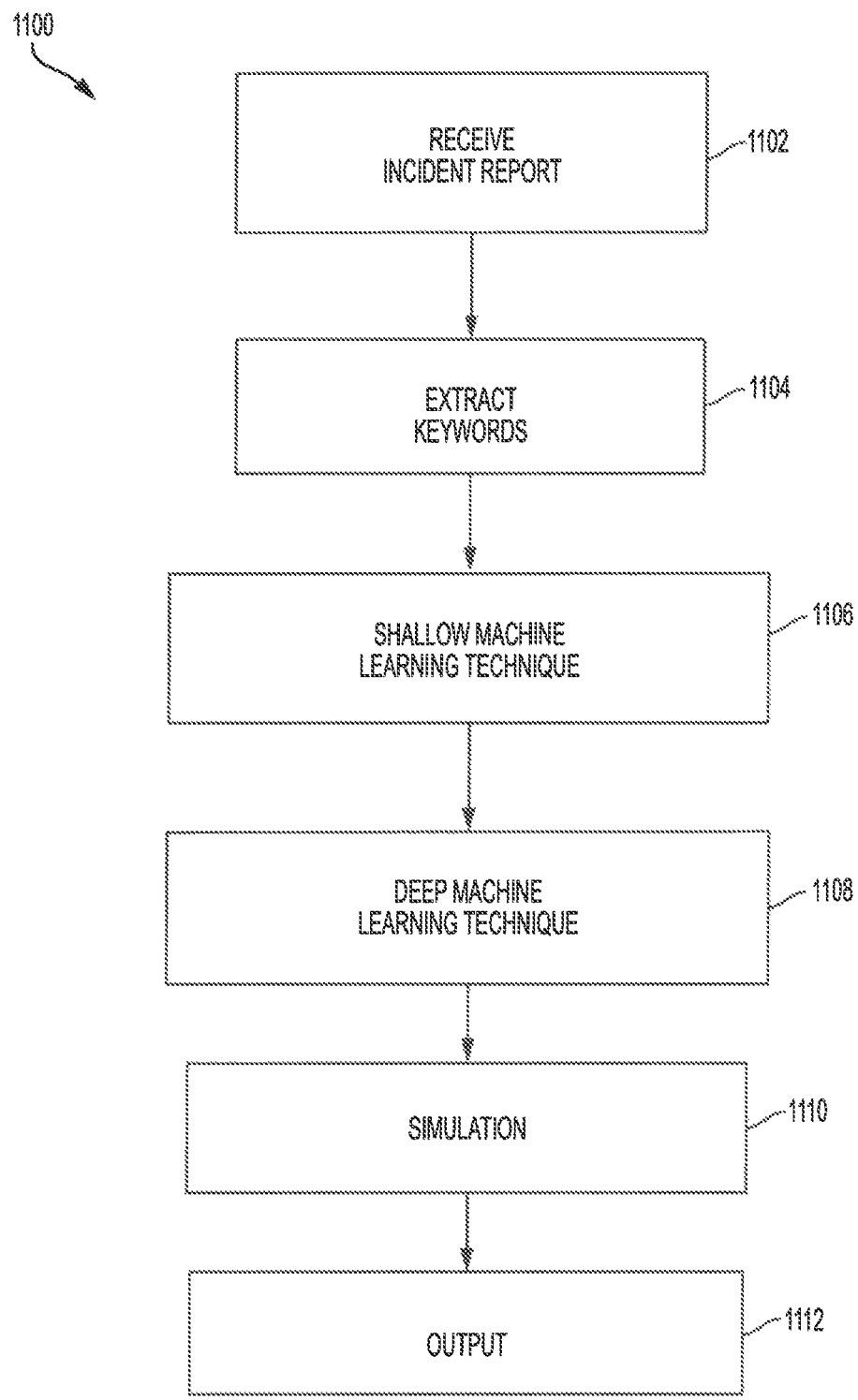
FIG. 11 is a flow diagram of a method according to various embodiments.

FIG. 11 is a flow diagram of a method 1100 according to various embodiments. Method 1000 may be implemented by system 100 of FIG. 1 using hardware shown and described in reference to FIG. 12, for example.

At block 1102, system 100 receives at least one initial incident report. The report may be as shown and described above in reference to FIG. 1. The initial incident reports may be received from electronic persistent storage and/or over a network such as the internet.

At block 1104, system 100 extracts keywords. Keywords may be extracted as shown and described above in reference to FIG. 3.

At block 1106, system 100 applies a shallow machine learning technique. The shallow machine learning technique may be applied as shown and described above in reference to FIG. 4.

At block 1108, system 100 applies a deep machine learning technique. The deep machine learning technique may be applied as shown and described above in reference to FIG. 6.

At block 1110, system 100 simulates the assets being protected. The simulation may be accomplished as shown and described above in reference to FIG. 7.

At block 1112, system 100 provides an output. The output may be to a human user, or to another computer system, e.g., a system configured to automatically implement remedial measures. Whether initiated by a human user or by system 100 automatically in response to its output, remedial measures may include installing at least one security measure, closing at least one port, turning off at least one asset, or disconnecting at least one asset.

Figure 12:
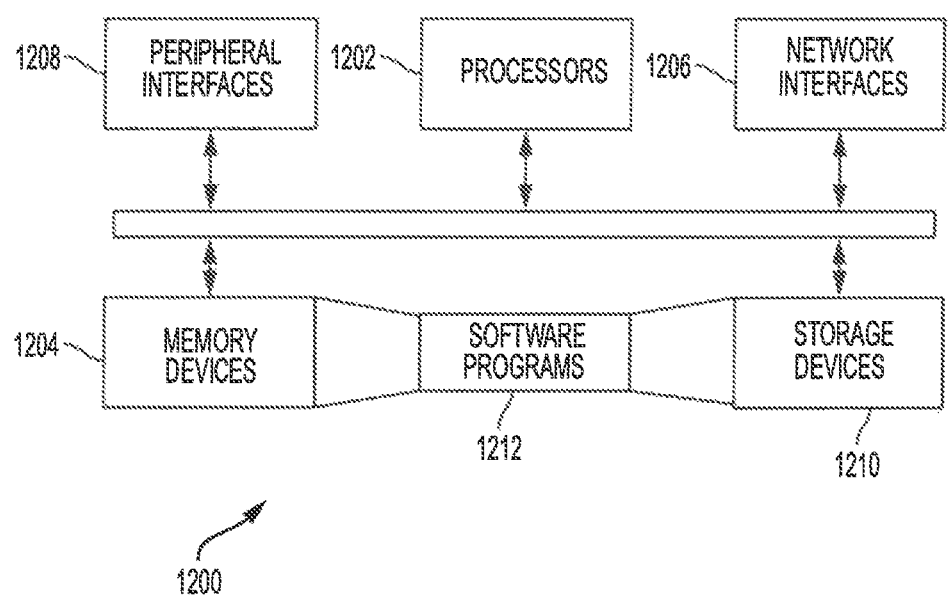
FIG. 12 is a schematic diagram of an example hardware implementation according to various embodiments.

FIG. 12 is a schematic diagram of an example hardware implementation according to various embodiments. The processor system 1200 may include one or more processors 1202 of varying core configurations (including multiple cores) and clock frequencies. The one or more processors 1202 may be operable to execute instructions, apply logic, etc. It will be appreciated that these functions may be provided by multiple processors or multiple cores on a single chip operating in parallel and/or communicably linked together. In at least one embodiment, the one or more processors 1202 may be or include one or more graphical processing units.

The processor system 1200 may also include a memory system, which may be or include one or more memory devices and/or computer-readable media 1204 of varying physical dimensions, accessibility, storage capacities, etc. such as flash drives, hard drives, disks, random access memory, etc., for storing data, such as images, files, and program instructions for execution by the processor 1202. In an embodiment, the computer-readable media 1204 may store instructions that, when executed by the processor 1202, are configured to cause the processor system 1200 to perform operations. For example, execution of such instructions may cause the processor system 1200 to implement one or more portions and/or embodiments of the methods described herein.

The processor system 1200 may also include one or more network interfaces 1206. The network interfaces 1206 may include any hardware, applications, and/or other software. Accordingly, the network interfaces 1206 may include Ethernet adapters, wireless transceivers, peripheral component interconnect (PCI) interfaces, and/or serial network components, for communicating over wired or wireless media using protocols, such as Ethernet, wireless Ethernet, etc.

The processor system 1200 may further include one or more peripheral interfaces 1208, for communication with a display screen, projector, keyboards, mice, touchpads, sensors, other types of input and/or output peripherals, and/or the like. In some implementations, the components of processor system 1200 need not be enclosed within a single enclosure or even located in close proximity to one another, but in other implementations, the components and/or others may be provided in a single enclosure.

The computer readable media 1204 may be physically or logically arranged or configured to store data on one or more storage devices 1210. The storage device 1210 may include one or more file systems or databases in any suitable format. The storage device 1210 may also include one or more software programs 1212, which may contain interpretable or executable instructions for performing one or more of the disclosed processes. When requested by the processor 1202, one or more of the software programs 1212, or a portion thereof, may be loaded from the storage devices 1210 to the memory devices 1204 for execution by the processor 1202.

Those skilled in the art will appreciate that the above-described componentry is merely one example of a hardware configuration, as the processor system 1200 may include any type of hardware components, including any necessary accompanying firmware or software, for performing the disclosed implementations. The processor system 1200 may also be implemented in part or in whole by electronic circuit components or processors, such as application-specific integrated circuits (ASICs) or field-programmable gate arrays (FPGAs).

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of anticipatory cyber defense of a plurality of networked assets, the method comprising:
   receiving a plurality of cyber incident reports;
   extracting keywords from the plurality of cyber incident reports;
   applying a shallow machine learning technique to at least the keywords and identifications of the plurality of networked assets to obtain an identification of a first subset of the networked assets vulnerable to at least a first threat scenario and an identification of the first threat scenario;
   applying a deep machine learning technique to at least the identification of a first subset of the networked assets vulnerable to the first threat scenario, the identification of the first threat scenario, the keywords, and the identifications of the plurality of networked assets, to obtain an identification of a second subset of the networked assets vulnerable to at least a second threat scenario and an identification of the second threat scenario;
   simulating the plurality of networked assets and the second threat scenario to identify at least one path through the plurality of networked assets vulnerable to at least a third threat scenario; and
   outputting an identification of the at least one path through the plurality of networked assets and an identification of the at least a third threat scenario.

2. The method of claim 1, further comprising:
   adding the identification of the at least one path through the plurality of networked assets and the identification of the at least a third threat scenario to the plurality of cyber incident reports;
   repeating the extracting, the applying a shallow machine learning technique, the applying a deep machine learning technique, and the simulating at least once to identify at least a second path through the plurality of networked assets vulnerable to at least a fourth threat scenario; and
   outputting an identification of the at least a second path through the plurality of networked assets and an identification of the at least a fourth threat scenario.

3. The method of claim 1, further comprising taking remedial measures against at least the third threat scenario.

4. The method of claim 3, wherein the remedial measures comprise at least one of: installing at least one security measure, closing at least one port, turning off at least one asset, or disconnecting at least one asset.

5. The method of claim 1, wherein the shallow machine learning technique comprises a nearest neighbor technique.

6. The method of claim 1, wherein the deep machine learning technique comprises a neural network technique, an association rule mining technique, or a word embedding technique.

7. The method of claim 1, wherein the simulating is performed by a discrete event simulation (DES) engine.

8. The method of claim 1, further comprising limiting a number of paths identified by the simulating.

9. The method of claim 8, wherein the limiting comprises at least one of: pruning the number of paths identified by the simulating, or limiting a number of levels in the deep machine learning technique.

10. The method of claim 1, wherein the extracting keywords from the plurality of cyber incident reports further comprises extracting keywords from the plurality of cyber incident reports, from at least one historical anomaly database, from at least one threat scenario database, and from an asset database.

11. A system for anticipatory cyber defense of a plurality of networked assets, the system comprising at least one electronic processor and at least one memory storing program instructions for execution by the at least one electronic processor, the at least one electronic processor configured to perform:
   receiving a plurality of cyber incident reports;
   extracting keywords from the plurality of cyber incident reports;
   applying a shallow machine learning technique to at least the keywords and identifications of the plurality of networked assets to obtain an identification of a first subset of the networked assets vulnerable to at least a first threat scenario and an identification of the first threat scenario;
   applying a deep machine learning technique to at least the identification of a first subset of the networked assets vulnerable to the first threat scenario, the identification of the first threat scenario, the keywords, and the identifications of the plurality of networked assets, to obtain an identification of a second subset of the networked assets vulnerable to at least a second threat scenario and an identification of the second threat scenario;
   simulating the plurality of networked assets and the second threat scenario to identify at least one path through the plurality of networked assets vulnerable to at least a third threat scenario; and
   outputting an identification of the at least one path through the plurality of networked assets and an identification of the at least a third threat scenario.

12. The system of claim 11, wherein the at least one electronic processor is further configured to perform:
   adding the identification of the at least one path through the plurality of networked assets and the identification of the at least a third threat scenario to the plurality of cyber incident reports;
   repeating the extracting, the applying a shallow machine learning technique, the applying a deep machine learning technique, and the simulating at least once to identify at least a second path through the plurality of networked assets vulnerable to at least a fourth threat scenario; and
   outputting an identification of the at least a second path through the plurality of networked assets and an identification of the at least a fourth threat scenario.

13. The system of claim 11, wherein the at least one electronic processor is further configured to take remedial measures against at least the third threat scenario.

14. The system of claim 13, wherein the remedial measures comprise at least one of: installing at least one security measure, closing at least one port, turning off at least one asset, or disconnecting at least one asset.

15. The system of claim 11, wherein the shallow machine learning technique comprises a nearest neighbor technique.

16. The system of claim 11, wherein the deep machine learning technique comprises a neural network technique, an association rule mining technique, or a word embedding technique.

17. The system of claim 11, wherein the simulating is performed by a discrete event simulation (DES) engine.

18. The system of claim 11, wherein the at least one electronic processor is further configured to limit a number of paths identified by the simulating.

19. The system of claim 18, wherein the limiting by at least one electronic processor comprises at least one of: pruning the number of paths identified by the simulating, or limiting a number of levels in the deep machine learning technique.

20. The system of claim 11, wherein the extracting keywords from the plurality of cyber incident reports further comprises extracting keywords from the plurality of cyber incident reports from at least one historical anomaly database, from at least one threat scenario database, and from an asset database.

* * * * *